United States Patent
Eksin et al.

(10) Patent No.: US 6,224,150 B1
(45) Date of Patent: May 1, 2001

(54) CUSHIONING FOR THE SEAT PART AND/OR THE BACKREST OF A VEHICLE SEAT

(75) Inventors: Harun Eksin, Gaeufelden; Hermann Kohfink, Laichingen; Karl Pfahler, Stuttgart; Rolf Schwarz, Eildberg, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/418,017

(22) Filed: Oct. 14, 1999

(30) Foreign Application Priority Data

Oct. 14, 1998 (DE) .............................. 198 47 384

(51) Int. Cl.⁷ ...................................... A47C 7/74
(52) U.S. Cl. ................. 297/180.1; 297/180.12; 297/180.13; 297/180.14
(58) Field of Search ............ 297/180.1, 180.12, 297/180.13, 180.14

(56) References Cited

U.S. PATENT DOCUMENTS

| 5,597,200 | * | 1/1997 | Gregory et al. | 297/180.13 |
| 5,902,014 |   | 5/1999 | Dinkel et al.  | 297/180.14 X |
| 5,934,748 | * | 8/1999 | Faust et al.   | 297/180.1 X |
| 6,019,420 | * | 2/2000 | Faust et al.   | 297/180.12 X |
| 6,050,809 | * | 4/2000 | Bayer et al.   | 297/180.14 X |

FOREIGN PATENT DOCUMENTS

| 19628698C1 | 10/1997 | (DE) . |
| 198 04 100 | 5/1999 | (DE) . |
| 0 909 677 | 4/1999 | (EP) . |
| 2137874A | * | 10/1984 | (GB) | 297/180.14 |

* cited by examiner

Primary Examiner—Peter M. Cuomo
Assistant Examiner—Rodney B White
(74) Attorney, Agent, or Firm—Evenson, McKeown, Edwards & Lenahan, P.L.L.C.

(57) ABSTRACT

A cushioning for the seat part and/or the backrest of a vehicle seat has a cushioning layer, a ventilation layer which is arranged above the cushioning layer and through which air can flow a cushioning cover which spans the cushioning surface and in which quilt seams for forming cushioning contours are made which penetrate the ventilation layer, and at least one electric fan for actively ventilating the cushioning which is accommodated in an air duct penetrating the cushioning layer. For the purpose of a constructively simplified design of the cushioning for lowering the manufacturing costs, the at least one air duct with the integrated fan is arranged in an area of a quilt seam such that the air flowing out of the air duct flows on both sides of the quilt seam into the ventilation layer. A low-cost vibration damping is achieved in that the fan is embedded in a rubberized-hair layer which is positioned in the ventilation-layer-side mouth area of the air duct in the cushioning layer.

35 Claims, 2 Drawing Sheets

CUSHIONING FOR THE SEAT PART AND/OR THE BACKREST OF A VEHICLE SEAT

BACKGROUND AND SUMMARY OF THE INVENTION

This application claims the priority of German application 198 47 384.2, filed in Germany on Oct. 14, 1998, the disclosure of which is expressly incorporated by reference herein.

The invention relates to a cushioning for the seat part and/or the backrest of a vehicle seat. Preferred embodiments of the invention relate to cushioning for the seat part and/or the backrest of a vehicle seat, comprising: a cushioning layer, a ventilation layer which covers a top side of the cushioning layer, through which ventilation layer air can flow and which particularly consists of a wide-meshed spaced knit, a cushioning cover which spans a cushioning surface and in which quilt seams for forming the cushioning contours are made which penetrate the ventilation layer, and at least one electric ventilator or fan for the active ventilation of the cushioning, which fan is accommodated in an air duct penetrating the cushioning layer from its underside facing away from the ventilation layer to its top side.

In the case of a known cushioning of this type (German Patent Document DE 196 28 698 C1, corresponding to U.S. Pat. No. 5,902,014 issued May 11, 1999), for the purpose of improving the seat air-conditioning comfort, particularly with a view to a fast cooling of the cushioning surface heated by sun radiation and an effective removal of transpiration moisture, a plurality of miniature fans are arranged in the cushioning layer in a distributed manner, which are each accommodated in an air duct penetrating the cushioning layer from its underside to the ventilation layer. The distribution of the fans takes place such that a uniform laminar venting of the ventilation layer is ensured. Since, for reasons of comfort, all miniature fans must receive a suitable vibration damping, the technical expenditures are considerable, which results in relatively high manufacturing costs, so that this actively ventilated cushioning is used only in high-priced passenger cars.

It is an object of the invention to design a cushioning with an active seat ventilation of the initially mentioned type in a constructively simple manner with a view to a manufacturing at more reasonable cost.

According to the invention, this object is achieved by providing a cushioning of the above-noted type, wherein the at least one air duct with the integrated fan is arranged in an area of a quilt seam such that the air flowing out of the air duct flows on both sides of the quilt seam into the ventilation layer.

The cushioning according to the invention has the advantage that, as the result of the arrangement of the at least one fan in the area of a quilt seam, which, if it does not completely block an air flow through the ventilation layer, nevertheless hinders it considerably, the cushioning sections can be ventilated equally well and effectively on both sides of the quilt seam by means of only a single fan. As the result, the number of the fans required for the ventilation of the cushioning and the number of the required vibration-damped suspensions in the cushioning is reduced and is limited only to one or two fans, depending on how many quilt seams exist in the cushioning.

In the case of simple seat cushionings, for example, in the case of low-cost full-foam seats, only a single transverse quilting exists as a rule, so that only a single fan is required. In order to achieve the same ventilation output as many small miniature fans, a larger fan with an increased air flow rate can be used which, with respect to the manufacturing and mounting costs, still remains significantly below the costs for a plurality of miniature fans to be integrated individually in the seat cushioning, particularly because the vibration damping is easier to achieve in the case of a larger fan.

Advantageous features of preferred embodiments of the present invention are described in this specification and in the claims.

According to an advantageous feature of preferred embodiments of the invention, the air duct is cut such into the cushioning layer that a quilting wire required for making the quilt seam crosses the air duct approximately in the center on its ventilation-layer-side mouth. As the result of this arrangement of the air duct, it is ensured that approximately symmetrical cushioning sections created by the quilting are ventilated with the same intensity.

According to an advantageous feature of preferred embodiments of the invention, in the area of the ventilation-layer-side air duct mouth, a blocking layer is placed onto the top side of the ventilation layer facing away from the air duct mouth, the surface of the blocking layer being larger than the clear opening of the air duct mouth. The blocking layer preferably consists of an airtight material and is perforated. As the result of this covering of the top side of the ventilation layer in the immediate air outlet area of the fan, the air is forced to spread over a wide surface into the ventilation layer and to uniformly ventilate the cushioning surface. In order to achieve in this case a continuous air flow in the ventilation layer, according to an advantageous feature of preferred embodiments of the invention, air outflow ducts for the air exiting of the air flowing through the ventilation layer are provided in the cushioning layer which lead out on the top and bottom side of the cushioning layer and are arranged at the largest possible distance from the ventilation-layer-side air duct mouth of the air duct with the integrated fan.

According to certain preferred embodiments of the invention, the fan is embedded at least partially in a rubberized hair layer which surrounds the ventilation-layer-side mouth area of the air duct. By this constructive measure, a very effective and low-cost vibration damping of the fan is achieved. Independently of the arrangement of the air ducts on one quilt seam respectively which reduces the number of fans, this type of vibration damping already results in noticeable savings. However, in conjunction with the quilt-seam-oriented arrangement of the fans, this type of vibration damping considerably reduces the manufacturing costs for the cushioning as a whole. As the result of the fastening of the fan housing in the rubberized-hair layer, which, according to preferred embodiments of the invention, preferably takes place by gluing, and the positioning of the rubberized-hair layer in the recess of the cushioning, the mounting of the fan, on the one hand, is very simple and time-saving and, on the other hand, the fan is integrated in the cushioning layer in a vibration-damped and protected manner. The bottom side of the air duct can be protected by covering grid plates.

If, according to another advantageous feature of preferred embodiments of the invention, the fan housing is constructed in the section covered by the rubberized-hair layer in an air-permeable manner, for example, provided with axial air outlet slots, as the result of the embedding of the fan in the air-permeable hair layer, a wide-surface air guidance can be achieved because the air also flows radially out of the fan and flows into the ventilation layer while being widely distributed over the rubberized-hair layer.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic representation of a longitudinal sectional view of a vehicle seat with the seat part and the backrest, including a cushioning constructed in accordance with preferred embodiments of the invention; and.

DETAILED DESCRIPTION OF THE DRAWINGS

Figure 1:
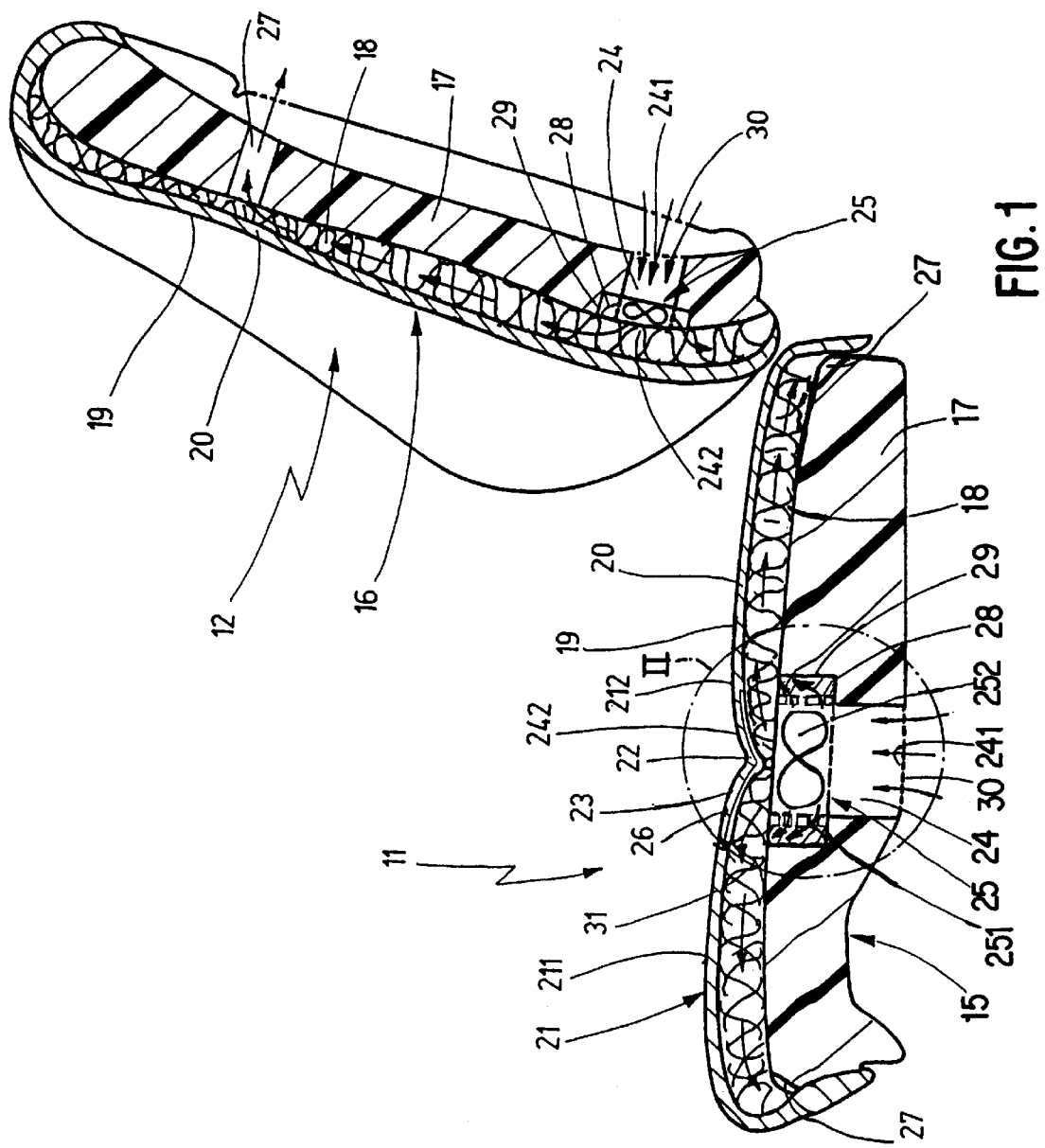
Figure 2:
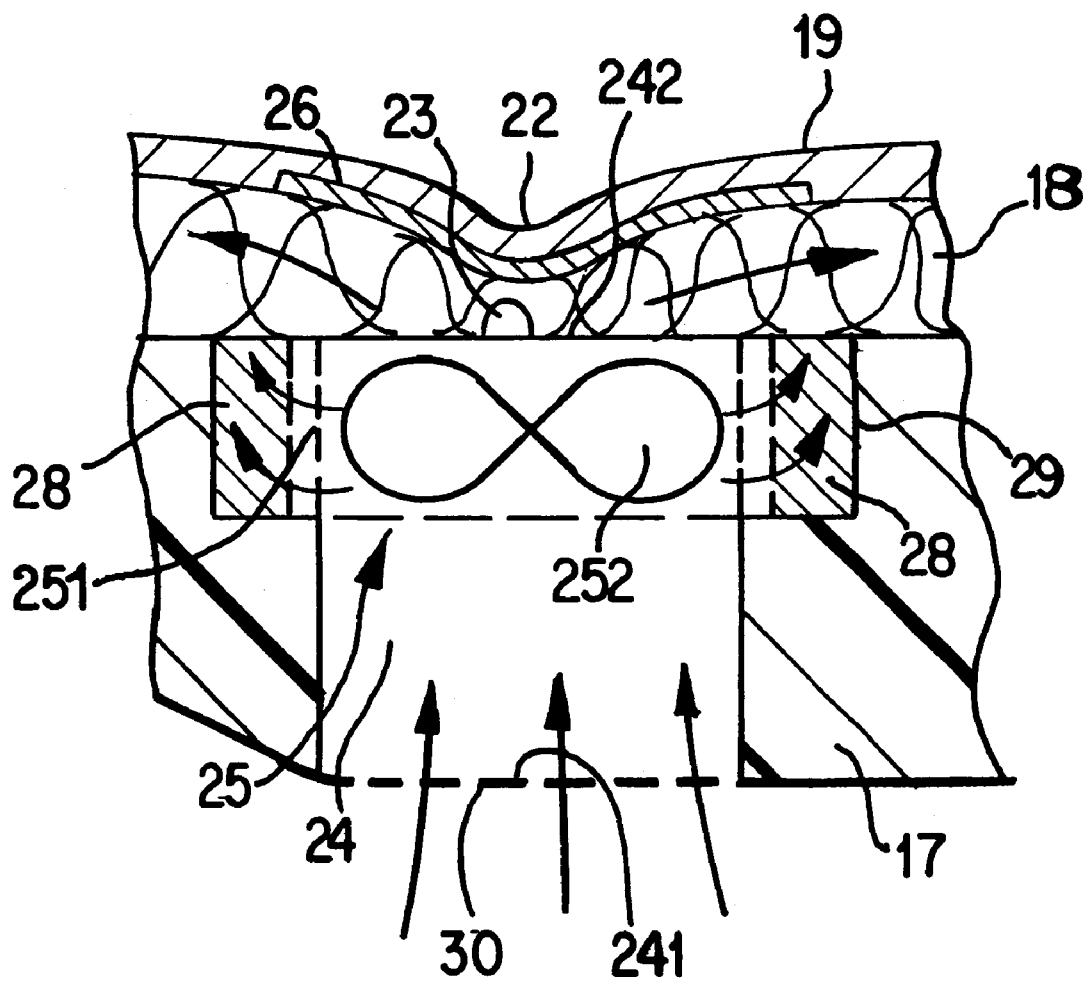
FIG. 2 is an enlarged partial view of section II of FIG. 1.

In a known manner, the vehicle seat schematically illustrated in the drawing has a seat part 11, which is adjustably held on the vehicle floor, and a backrest 12 which, for the adjustment of its inclination, is connected with the seat part 11 by way of a swivel grid. The seat part 11 and the backrest 12 each have a cushioning support and a seat cushion 15 or backrest cushion 16 fastened on the cushioning support. The cushioning support, which is not shown here, may, for example, be constructed as a spring core made of spring wire which is mounted in a frame of the seat part or of the backrest.

The seat cushion 15 comprises a cushioning layer 17 made of a foam material which rests on the cushioning support; a ventilation layer 18 which covers the top side of the cushioning layer 17 facing away from the cushioning support and through which air can flow and which consists of a wide-meshed spacing knit or a rubberized-hair layer; and a cushioning cover 19 made of a textile material or perforated leather or synthetic leather which spans the cushioning surface. Generally, an air-permeable pressure distribution layer 20 is also arranged between the ventilation layer 18 and the air-permeable cushioning cover 19, which pressure distribution layer 20 may consist of a spacing knit, a nonwoven or an open-pored foam. For constructing cushioning contours, such as seat surfaces, side cheeks and the like, and for producing a tensioning of the cushioning, quilt seams are provided in the cushioning cover 19 which penetrate the ventilation layer 18 and reduce the layer thickness of the ventilation layer 18. In the embodiment of the seat cushion 15 illustrated in the drawing, a quilt seam 22 extends transversely in the seat surface area and divides the seat surface 21 into two approximately equally large surface sections 211 and 212. In this case, the quilting is carried out on a quilting wire 23 which is mounted in the cushioning support.

For the active ventilation of the seat cushion 15 for improving the seat air-conditioning comfort, an air duct 24 is cut into the cushioning layer 17 and leads out on the bottom and top side of the cushioning layer 17, and a ventilator or fan 25 is integrated in the air duct 24 such that air is taken in by way of the air duct mouth 241 on the bottom side of the cushioning layer 17 and is blown by way of the air duct mouth 242 on the top side of the cushioning layer 17 into the ventilation layer 18. The air duct 24 is arranged in the cushioning layer 17 such that the quilting wire 23 of the quilt seam 22 crosses the top-side air duct mouth 242 approximately in the center, so that an approximately equally large air outlet surface exists on the left and the right of the quilt seam 22, which ensures that approximately equally large amounts of air flow into the ventilation layer 18 in the surface section 211 and into the ventilation layer 18 in the surface section 212.

In order to improve the flow through the ventilation layer 18, a blocking layer 26 is placed in the area of the top-side air duct mouth 242 onto the top side of the ventilation layer 18 facing away from the air duct mouth 242, the surface of the blocking layer 26 being larger than the clear cross-section of the air duct mouth 242. In the embodiment shown, the blocking layer 26 consists of an airtight foil which is perforated so that a smaller portion of the air flowing out from the fan 25 also ventilates the area of the cushioning covered by the blocking layer 26. By means of this blocking layer 26, the air flowing out of the air duct 24 is forced to spread over a wide surface in the ventilation layer 18 and to uniformly ventilate the seat surface. In order to achieve a continuous air flow in this case, air outflow ducts 27 are constructed in the cushioning layer 17, which lead out on the top side of the cushioning layer and in the side areas of the cushioning layer 17 and have a largest possible distance from the air duct mouth 242. The sectional representation of the drawing shows two air outflow ducts 27 of the air outflow ducts 27 which are arranged at a transverse distance from one another; of these, one air outflow duct 27 is arranged on the rearward side of the cushioning layer 17 and the other air outflow duct 27 is arranged on the forward side of the cushioning layer 17.

The fan 25 has a ring-shaped, hollow-cylindrical housing 251 in which a fan wheel 252 is rotatably disposed coaxially to the fan housing 251. The fan housing 251 pushed into the air duct 24 can fill the entire air duct 24, but in the described embodiment is constructed only with a small axial width so that the fan housing 251 extends only over a portion of the length of the air duct 24. In this case, the fan housing 251 is arranged close to the top-side air duct mouth 242 and closes off flush therewith. For fastening the fan 25 in the cushioning layer 17 while simultaneously achieving a lower-cost vibration damping, the fan 25 is embedded in a rubberized-hair layer 28 which surrounds the top-side mouth area of the air duct 24. In this case, the fan housing 251 is glued into the rubberized-hair layer 28, and the rubberized-hair layer 28 is placed into a recess 29 made from the top side of the cushioning layer 17. As illustrated in the drawing, the fan housing 251 has an air-permeable construction in the area of the rubberized-hair layer 28, that is, with a perforation or here with axial air slots 31, so that the air can also flow radially out of the fan housing 251. This portion of the air flow flows through the air-permeable rubberized-hair layer 28 and is distributed by way of the rubberized-hair layer 28 over a wide surface into the ventilation layer 18 on the left and the right of the quilt seam 22 in the surface sections 211 and 212.

As also illustrated schematically in the drawing, the bottom-side air duct mouth 241 of the air duct 24 is covered by protective grid 30 so that the fan 25 as a whole is accommodated in the cushioning layer 17 in a protected and vibration-damped manner.

The backrest cushioning 16 illustrated in the drawing basically has the same construction as the above-described seat cushion 15 so that a detailed description of the construction of the cushioning is not necessary. To indicate the conformance, the elements existing in the backrest cushioning 16, which with respect to their construction and operating method correspond to those in the seat cushion 15 are provided with the same reference numbers. Furthermore, the backrest cushioning 16 is slightly modified in that the air duct 24 with the integrated fan 25 is not arranged in the center in the backrest cushion 16 but in the lordosis area and the air outflow duct 27 extends completely through the cushioning layer 17 and leads out on its top and bottom side.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Cushioning for at least one of a seat part and a backrest of a vehicle seat, comprising:
   a cushioning layer,
   a ventilation layer which covers a top side of the cushioning layer, through which ventilation layer air can flow and which particularly consists of a wide-meshed spaced knit,
   a cushioning cover which spans a cushioning surface and in which quilt seams for forming cushioning contours are made which penetrate the ventilation layer, and
   at least one electric fan for active ventilation of the ventilation layer, which fan is accommodated in an air duct penetrating the cushioning layer from an underside of the cushioning layer facing away from the ventilation layer to a top side of the cushioning layer,
   wherein the at least one air duct with the fan is arranged in an area of a quilt seam such that the air flowing out of the air duct flows on both sides of the quilt seam into the ventilation layer.

2. Cushioning according to claim 1, wherein the quilt seam has a quilting wire on which the quilting takes place, and
   wherein the air duct is cut into the cushioning layer such that the quilting wire crosses the air duct on a ventilation-layer-side air duct mouth approximately in a center of the air duct.

3. Cushioning according to claim 2, wherein a blocking layer, preferably made of an airtight material, is placed in an area of a ventilation-layer-side air duct mouth onto a top side of the ventilation layer facing away from the air duct mouth, the surface of the blocking layer being larger than a clear cross-section of the air duct mouth.

4. Cushioning according to claim 3, wherein the blocking layer is perforated.

5. Cushioning according to claim 2, wherein air outflow ducts are constructed in the cushioning layer which lead out on the top side and bottom side or edge side of the cushioning layer and are arranged at the largest possible distance from the air duct with the fan.

6. Cushioning according to claim 5, wherein a rubberized-hair layer is positioned in a recess in the cushioning layer made from a ventilation-layer-side top side of the cushioning layer.

7. Cushioning according to claim 6, wherein the fan is supported on a fan housing which is glued into the rubberized-hair layer.

8. Cushioning according to claim 7, wherein the fan is supported in a fan housing which has axial air outlet slots in a section covered by the rubberized-hair layer.

9. Cushioning according to claim 2, wherein the fan has a hollow-cylindrical housing which is inserted into the air duct and extends completely or partially along the length of the air duct cut into the cushioning layer.

10. Cushioning according to claim 9, wherein the fan has a fan wheel rotatably disposed in the fan housing with a coaxial bearing axis, and
    wherein the fan wheel is arranged close to the ventilation-layer-side air duct mouth.

11. Cushioning according to claim 2, wherein an air duct mouth situated on an underside of the cushioning layer is covered in a flush manner by a protective grid.

12. Cushioning according to claim 1, wherein a blocking layer, preferably made of an airtight material, is placed in an area of a ventilation-layer-side air duct mouth onto a top side of the ventilation layer facing away from the air duct mouth, the surface of the blocking layer being larger than a clear cross-section of the air duct mouth.

13. Cushioning according to claim 12, wherein air outflow ducts are constructed in the cushioning layer which lead out on the top side and bottom side or edge side of the cushioning layer and are arranged at the largest possible distance from the air duct with the fan.

14. Cushioning according to claim 12, wherein the fan has a hollow-cylindrical housing which is inserted into the air duct and extends completely or partially along the length of the air duct cut into the cushioning layer.

15. Cushioning according to claim 12, wherein the blocking layer is perforated.

16. Cushioning according to claim 15, wherein air outflow ducts are constructed in the cushioning layer which lead out on the top side and bottom side or edge side of the cushioning layer and are arranged at the largest possible distance from the air duct with the fan.

17. Cushioning according to claim 15, wherein the fan has a hollow-cylindrical housing which is inserted into the air duct and extends completely or partially along the length of the air duct cut into the cushioning layer.

18. Cushioning according to claim 1, wherein air outflow ducts are constructed in the cushioning layer which lead out on the top side and bottom side or edge side of the cushioning layer and are arranged at the largest possible distance from the air duct with the fan.

19. Cushioning according to claim 18, wherein the fan has a hollow-cylindrical housing which is inserted into the air duct and extends completely or partially along the length of the air duct cut into the cushioning layer.

20. Cushioning according to claim 1, wherein the fan has a hollow-cylindrical housing which is inserted into the air duct and extends completely or partially along the length of the air duct cut into the cushioning layer.

21. Cushioning according to claim 20, wherein the fan has a fan wheel rotatably disposed in the fan housing with a coaxial bearing axis, and
    wherein the fan wheel is arranged close to the ventilation-layer-side air duct mouth.

22. Cushioning according to claim 1, wherein the fan is at least partially embedded in an air-permeable rubberized-hair layer which surrounds a ventilation-layer-side mouth area of the air duct.

23. Cushioning according to claim 22, wherein the fan is supported on a fan housing which is glued into the rubberized-hair layer.

24. Cushioning according to claim 22, wherein the fan is supported in a fan housing which has axial air outlet slots in a section covered by the rubberized-hair layer.

25. Cushioning according to claim 1, wherein an air duct mouth situated on an underside of the cushioning layer is covered in a flush manner by a protective grid.

26. A cushioning assembly for a vehicle seat comprising:
    a cushioning layer,
    a ventilation layer on top of the cushioning layer,
    a cushioning cover on top of the ventilation layer with a quilt seam forming cushioning contours,
    an air duct penetrating the cushioning layer, and
    a ventilating fan disposed in the air duct and operable to supply ventilating air to the ventilation layer,
    wherein the air duct is disposed adjacent the quilt seam so that said ventilating air flows out of the air duct to respective opposite sides of the quilt seam into the ventilation layer.

27. A cushioning assembly according to claim 26, wherein said quilt seam is disposed centrally of an outlet of the air duct.

28. A cushioning assembly according to claim 27, wherein said quilt seam includes a quilting wire which crosses the air duct in a central portion thereof.

29. A cushioning assembly according to claim 28, comprising a blocking layer interposed between the ventilation layer and the cushioning cover, said blocking layer being smaller than the cushioning cover and larger than an outflow cross-section of the air duct.

30. A cushioning assembly according to claim 29, comprising an air permeable rubberized hair layer in said air duct, wherein a housing of said fan is supported on the rubberized hair layer.

31. A cushioning assembly according to claim 30, wherein said cushioning layer includes air outflow ducts therethrough at positions spaced from the air duct.

32. A cushioning assembly according to claim 28, wherein said cushioning layer includes air outflow ducts therethrough at positions spaced from the air duct.

33. A cushioning assembly according to claim 26, comprising a blocking layer interposed between the ventilation layer and the cushioning cover, said blocking layer being smaller than the cushioning cover and larger than an outflow cross-section of the air duct.

34. A cushioning assembly according to claim 26, wherein said cushioning layer includes air outflow ducts therethrough at positions spaced from the air duct.

35. A cushioning assembly according to claim 26, comprising an air permeable rubberized hair layer in said air duct, wherein a housing of said fan is supported on the rubberized hair layer.

* * * * *